(12) United States Patent
Yamada et al.

(10) Patent No.: US 8,243,351 B2
(45) Date of Patent: Aug. 14, 2012

(54) IMAGE READING APPARATUS, MULTIFUNCTION PRINTER APPARATUS, AND IMAGE PROCESSING METHOD

(75) Inventors: Akitoshi Yamada, Yokohama (JP); Tohru Ikeda, Yokohama (JP); Hidetsugu Kagawa, Kawasaki (JP); Fumihiro Goto, Kawasaki (JP); Takashi Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 907 days.

(21) Appl. No.: 12/339,052

(22) Filed: Dec. 19, 2008

(65) Prior Publication Data

US 2009/0161182 A1 Jun. 25, 2009

(30) Foreign Application Priority Data

Dec. 21, 2007 (JP) ................................. 2007-331068

(51) Int. Cl.
*G03F 3/08* (2006.01)

(52) U.S. Cl. ........ 358/520; 358/1.9; 358/3.26; 358/504; 358/518; 382/274; 382/275

(58) Field of Classification Search ................... 358/1.9, 358/3.26–3.27, 518; 382/274, 275
See application file for complete search history.

(56) References Cited

U.S. PATENT DOCUMENTS

| | | | |
|---|---|---|---|
| 5,036,186 A * | 7/1991 | Tsao .......................... 250/208.1 |
| 5,377,025 A | 12/1994 | Spaulding et al. |
| 5,539,541 A | 7/1996 | Ushida |
| 5,687,006 A | 11/1997 | Namizuka et al. |
| 5,689,590 A * | 11/1997 | Shirasawa et al. ............ 382/254 |
| 5,912,744 A | 6/1999 | Nakane |
| 6,088,130 A | 7/2000 | Matsukubo |
| 6,172,356 B1 * | 1/2001 | Ogura et al. ............. 250/227.11 |
| 6,233,060 B1 | 5/2001 | Shu et al. |
| 6,290,318 B1 | 9/2001 | Yasukawa |
| 6,323,957 B1 | 11/2001 | Ball |
| 6,456,748 B1 * | 9/2002 | Yushiya et al. ................ 382/312 |
| 6,657,748 B1 * | 12/2003 | Okita et al. .................... 358/461 |
| 6,924,839 B2 | 8/2005 | Eiho et al. |
| 6,967,605 B2 * | 11/2005 | Fujihara et al. ................ 341/139 |
| 6,972,877 B1 * | 12/2005 | Nakamura .................... 358/474 |
| 6,995,866 B2 | 2/2006 | Feng et al. |
| 7,099,041 B1 | 8/2006 | Moriya et al. |
| 7,119,934 B2 * | 10/2006 | Yoshida et al. ................ 358/487 |
| 7,208,715 B2 * | 4/2007 | Kuan .......................... 250/208.1 |
| 7,224,494 B2 * | 5/2007 | Saitou et al. ................... 358/474 |
| 7,627,189 B2 * | 12/2009 | Donomae et al. ............. 382/254 |
| 2003/0161007 A1 | 8/2003 | Maurer et al. |
| 2006/0077406 A1 | 4/2006 | Bhattacharjya |

FOREIGN PATENT DOCUMENTS

| | | |
|---|---|---|
| EP | 1830380 A1 | 9/2007 |
| JP | 2004-013339 A | 1/2004 |
| JP | 2005-184390 | 7/2005 |
| JP | 2005-295153 | 10/2005 |
| JP | 3750429 | 3/2006 |
| JP | 2006-197531 | 7/2006 |

* cited by examiner

*Primary Examiner* — Richard Zhu
(74) *Attorney, Agent, or Firm* — Canon USA Inc IP Division

(57) ABSTRACT

This invention is directed to a method capable of performing satisfactory image reading by absorbing variations in each apparatus. According to this method, in primary color reading, light emitting unit sequentially irradiates an image original with light components of three primary colors and reads the image original, and in complementary color reading, the light emitting unit simultaneously irradiates the image original with one of three different color combinations, which includes two of the light components of three primary colors, and reads the image original. Each of the primary and complementary color readings includes image processing of executing shading correction of image data based on calibration data obtained by calibrating the light emitting unit when reading the image original.

10 Claims, 17 Drawing Sheets

IMAGE READING APPARATUS, MULTIFUNCTION PRINTER APPARATUS, AND IMAGE PROCESSING METHOD

BACKGROUND OF THE INVENTION

1. Field of the Invention

The present invention relates to an image reading apparatus, multifunction printer apparatus, and image processing method. Particularly, the present invention relates to an image reading apparatus, multifunction printer apparatus, and image processing method which correct density or brightness represented by image data obtained by optically reading an image original.

2. Description of the Related Art

A color scanner is known as an image reading apparatus which reads an image by switching light of different light emission wavelengths. Such a color scanner has a linear light source and an image sensor provided on a carriage movable in a predetermined direction. The light source includes LEDs capable of irradiating light emission wavelengths corresponding to three primary colors of light, that is, red (R), green (G), and blue (B). The carriage is moved in a direction (sub-scanning direction) perpendicular to the elongated direction (main scanning direction) of the linear light source. The liner image sensor receives reflected light obtained by irradiating an image original with light and reads the image original. To read the image original, a scanning read method is employed.

In the scanning read method, an original is read by switching three LEDs serving as a light source while conveying a CIS (Contact Image Sensor) unit in the sub-scanning direction. More specifically, the R component data of a color image is obtained by lighting a red LED. Next, the G component data is obtained by lighting a green LED. Finally, the B component data is obtained by lighting a blue LED. Image data of one line is obtained in one red, green, and blue LED lighting cycle. Image data of one page of the image original is obtained by repeating the lighting cycle while conveying the CIS unit in the sub-scanning direction.

In scanning read in which the red, green, and blue LEDs are sequentially turned on, color misalignment occurs. As a method of reducing color misalignment, a method of performing reading by turning on two LED light sources between charge readout timings is known, as disclosed in Japanese Patent Laid-Open No. 2005-184390.

If bright LEDs are used to improve the signal-to-noise ratio, the cost increases. To solve this problem, a method of reading an image by simultaneously turning on two LED light sources is known, as disclosed in Japanese Patent Laid-Open No. 2006-197531.

Alternatively, an image forming apparatus described in Japanese Patent No. 3750429 is known, which performs a reading operation appropriate for an original by switching illumination light in accordance with the original type such as a negative original or positive original.

In these image original reading methods, the actual reading image characteristic includes variations in the manufacture of the image reading apparatus. LEDs used as a light emission source include variations in the forward voltage, variations in the current-light emission characteristic, and temperature dependency. The characteristic also changes depending on the emission color.

For these reasons, the quality of a read image can change variously depending on the apparatus that has read it.

To reduce the variations between apparatuses, for example, Japanese Patent Laid-Open No. 2005-184390 proposes a method of calibrating the LED light emission characteristic of each apparatus by setting, as the ON pulse width of each LED, a pulse width that makes the output amplitude match a predetermined value.

FIG. 16 is a time chart showing a primary color reading method of reading an image original by lighting only one color LED at a single timing.

As shown in FIG. 16, according to this method, the red (R), green (G), and blue (B) LEDs are sequentially turned on so that the respective color component data are output in synchronism with a pulse signal SH. When the red LED changes from ON to OFF, and the pulse signal SH is turned on, R component data is output. Similarly, when the green LED or blue LED changes from ON to OFF, and the pulse signal SH is turned on, G component data or B component data is output.

Let (R,G,B)=(255,255,255) be the brightness value of a read white original, and (R,G,B)=(0,255,255) be the brightness value of a read cyan original.

When an edge at which an original changes from white to cyan is read at the timing shown in FIG. 16, the output data of a line (a) is (R,G,B)=(255,255,255), and the output data of a line (b) is (R,G,B)=(0,255,255). In the line (a), at the light emission timing of the red LED, the original color is white. Hence, the brightness output value of the R component is 255. At the light emission timings of the green and blue LEDs, the original color is cyan. Hence, the brightness output value of the G component is 255. The brightness output value of the B component is also 255.

FIG. 17 is a time chart showing a complementary color reading method of reading an image original by simultaneously turning on two color LEDs (simultaneously lighting two primary colors).

When an edge at which an original changes from white to cyan is read by the complementary color reading method at the timing shown in FIG. 16, the brightness output values are as follows. The output data of a line (c) is (RG,GB,BR)=(510, 510,255), and the output data of a line (d) is (RG,GB,BR)= (255,510,255). The read data is converted into the brightness values of the R, G, and B color components by equation (1). In the line (c), (R,G,B)=(128,255,128). In the line (d), (R,G, B)=(0,255,255).

$$\begin{pmatrix} R \\ G \\ B \end{pmatrix} = \frac{1}{2} \begin{pmatrix} -1 & 1 & 1 \\ 1 & -1 & 1 \\ 1 & 1 & -1 \end{pmatrix} \begin{pmatrix} GB \\ BR \\ RG \end{pmatrix} \quad (1)$$

Using the obtained values of the lines (a) to (d), a CTF (Contrast Transfer Function) is calculated by equation (2). In the primary color reading method, CTF=18%. In the complementary color reading method, CTF=7%.

$$CTF = \frac{W_p - B_p}{W_p + B_p} \cdot 100 \quad (2)$$

Note that, in equation (2), $W_p$ is the maximum brightness, and $B_p$ is the minimum brightness.

As understood from a comparison between the calculated CTFs, the CTF value obtained by the complementary color reading method is smaller than that obtained by the primary color reading method. That is, if the complimentary reading method is employed, an image having a blurred edge is read.

The receiving side of the reflected light of each LED also suffers the influence of the transfer characteristic of the optical system and the characteristic of the photoelectric transducer. The variations on the side of the LEDs serving as a light emission source and those on the light receiving side combine together to yield many combinations of variations in individual image reading apparatuses and many interactions therebetween.

As described above, the conventional image original reading method does not consider the variations on the light receiving side of the image reading apparatus, the combinations of the variations on the light emitting side and those on the light receiving side, and the interactions therebetween. It is therefore impossible to sufficiently absorb the variations in the image characteristic of an entire image reading apparatus.

SUMMARY OF THE INVENTION

Accordingly, the present invention is conceived as a response to the above-described disadvantages of the conventional art.

For example, an image reading apparatus, a multifunction printer apparatus using the apparatus, and an image processing method according to this invention are capable of performing satisfactory image reading by absorbing variations in each apparatus.

According to one aspect of the present invention, there is provided an image reading apparatus which irradiates an image original with light, receives reflected light, and reads the image original based on the received light, the apparatus comprising: light emitting means for emitting light components of three primary colors; light receiving means for receiving the light reflected by the image original irradiated with the light emitting means; image processing means for processing image data obtained based on the reflected light received by the light receiving means; and lighting control means for controlling the light emitting means to read the image original using one of primary color reading performed by causing the light emitting means to sequentially irradiate the image original with the light components of three primary colors and read the image original, and complementary color reading performed by causing the light emitting means to irradiate the image original with one of three different color combinations, which includes two of the light components of three primary colors, and read the image original, wherein the image processing means executes shading correction of the image data based on calibration data obtained by calibrating the light emitting means.

According to another aspect of the present invention, there is provided a multifunction printer comprising: the above-described image reading apparatus; and print means for printing an image on a printing medium based on one of externally input image data and image data representing an image read by the image reading apparatus.

According to still another aspect of the present invention, there is provided an image processing method of causing light emitting means for emitting light components of three primary colors to irradiate an image original with light, causing light receiving means to receive reflected light, and processing image data obtained based on the received light, the method comprising: a primary color reading step of causing the light emitting means to sequentially irradiate the image original with the light components of three primary colors and read the image original; and a complementary color reading step of causing the light emitting means to irradiate the image original with one of three different color combinations, which includes two of the light components of three primary colors, and read the image original, wherein each of the primary color reading step and the complementary color reading step includes an image processing step of executing shading correction of the image data based on calibration data obtained by calibrating the light emitting means when reading the image original.

The invention is particularly advantageous since shading correction is executed based on calibration data acquired by performing calibration. This allows absorbing the variations on both the light emitting side and the light receiving side and interactions therebetween and also absorbing the variations in the entire image characteristic of each image reading apparatus. It is therefore possible to execute satisfactory image reading.

Further features of the present invention will become apparent from the following description of exemplary embodiments (with reference to the attached drawings).

DESCRIPTION OF THE EMBODIMENTS

Figure 1A:
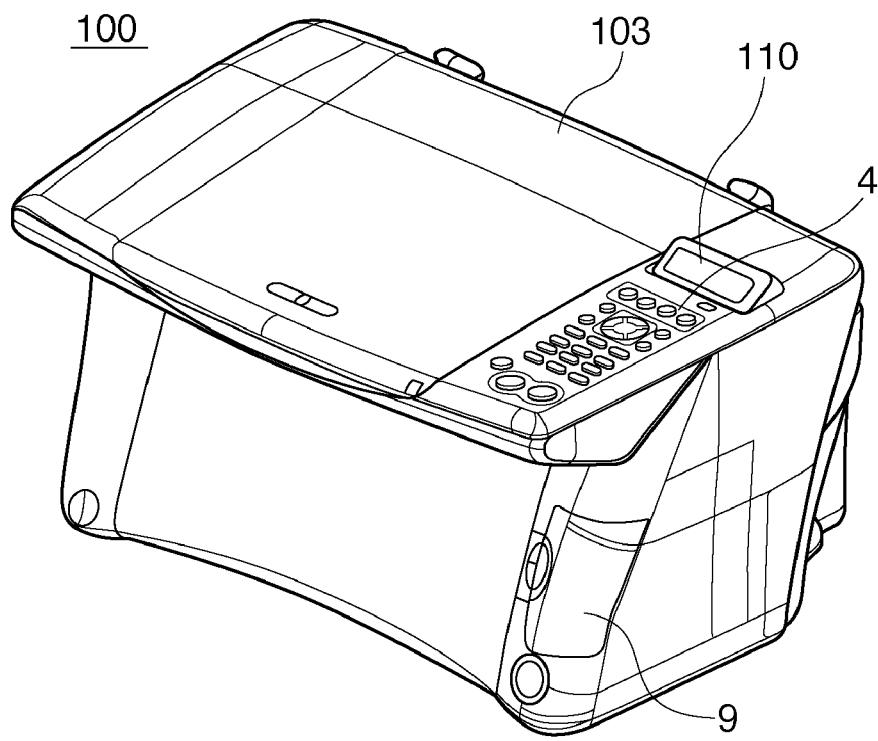
FIGS. 1A and 1B are perspective views showing the schematic arrangement of a multifunction printer (MFP) according to a typical embodiment of the present invention.

Exemplary embodiments of the present invention will now be described in detail in accordance with the accompanying drawings. The same reference numerals denote already described parts, and a repetitive description thereof will be omitted.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Furthermore, unless otherwise stated, the term "printing element" generally means a set of a discharge orifice, a liquid channel connected to the orifice and an element to generate energy utilized for ink discharge.

The arrangement of a multifunction printer apparatus (to be referred to as an "MFP apparatus" hereinafter) to be used as a common embodiment will be described first.

<MFP Apparatus>

Figure 1B:
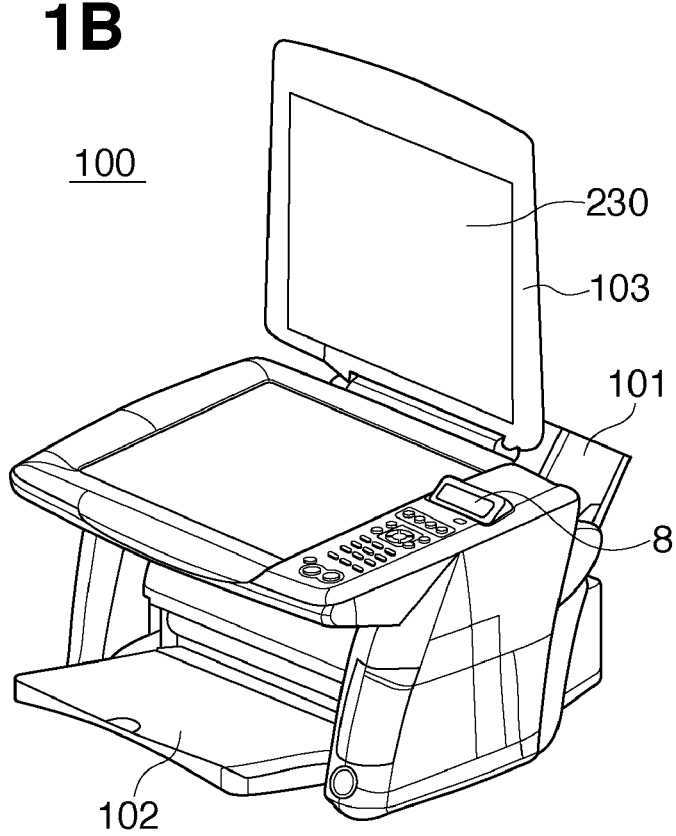

FIGS. 1A and 1B are perspective views showing the schematic arrangement of an MFP apparatus 100 according to a typical embodiment of the present invention.

The MFP apparatus can print an image on a printing medium such as a printing paper sheet based on image data from a connected host (not shown) or image data stored in a memory card, and also read and copy an image original.

FIG. 1A shows a state in which an original cover 103 is closed. FIG. 1B shows a state in which a printing medium tray 101, a discharge tray 102, and the original cover 103 are open.

A reading unit 8 including a CIS (Contact Image Sensor) unit reads an image original and outputs analog brightness signals of R, G, B components. A card interface 9 is used to receive a memory card in which image files taken by, for example, a digital still camera (not shown) are stored and read out image data from the memory card in accordance with a predetermined operation on an operation unit 4. The MFP apparatus 100 also includes a display unit such as an LCD 110. The LCD 110 is used to display contents set by the operation unit 4 or a function selection menu.

Figure 2:
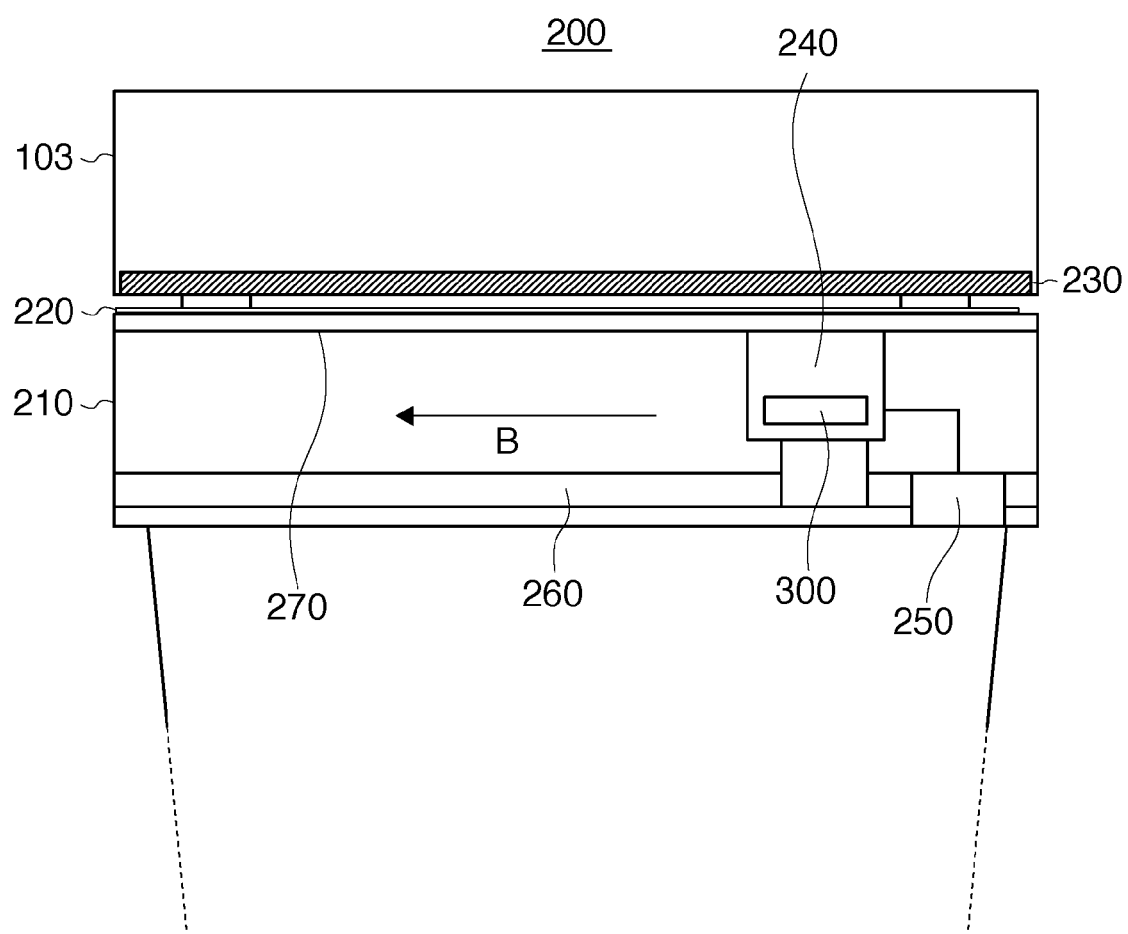
FIG. 2 is a sectional view of an image reading apparatus provided on the upper side of the MFP apparatus shown in FIGS. 1A and 1B.

FIG. 2 is a sectional view of an image reading apparatus provided on the upper side of the MFP apparatus shown in FIGS. 1A and 1B.

As shown in FIG. 2, an image reading apparatus 200 includes a main body 210, and a press plate 230 which presses an original 220 as a reading object and shields external light. The press plate 230 is set on the lower side of the original cover 103. The main body 210 includes an optical unit 240, a circuit board 250 electrically connected to the optical unit 240, a sliding rod 260 serving as a rail to scan the optical unit 240, and an original glass table 270. The optical unit 240 incorporates a CIS unit 300 which irradiates the original 220 with light, receives reflected light, and converts it into an electrical signal. In image reading, the optical unit 240 scans the original 220 placed on the original glass table 270 in the direction (sub-scanning direction) of an arrow B, thereby reading an image printed on the original 220.

Figure 3:
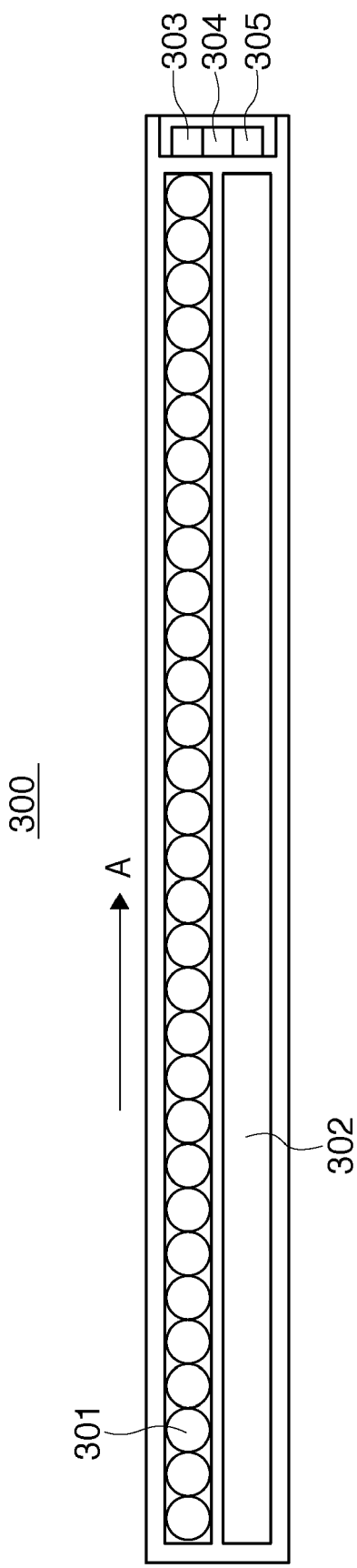
FIG. 3 is a side sectional view showing the detailed structure of a CIS (Contact Image Sensor) unit.

FIG. 3 is a side sectional view showing the detailed structure of the CIS unit 300.

As shown in FIG. 3, the CIS unit 300 includes a red LED 303 which emits red light, a green LED 304 which emits green light, and a blue LED 305 which emits blue light. In original reading, the respective color LEDs are time-divisionally turned on for each line. The original is uniformly irradiated with the emitted light via a light guide 302. A SELFOC® lens 301 condenses the reflected light for each pixel. An image of the light is formed on a photoelectric transducer (not shown) in the CIS unit so that the received light is converted into an electrical signal. An image signal of one line including R, G, and B color component signals is output in this way. The CIS unit 300 is moved in the sub-scanning direction, thereby reading the image all over the original. The direction of an arrow A which represents the cell array direction of the SEL-FOC® lens 301 is called a main scanning direction. The main scanning direction is perpendicular to the sub-scanning direction. In FIG. 2, the main scanning direction is perpendicular to the drawing surface.

Figure 4:
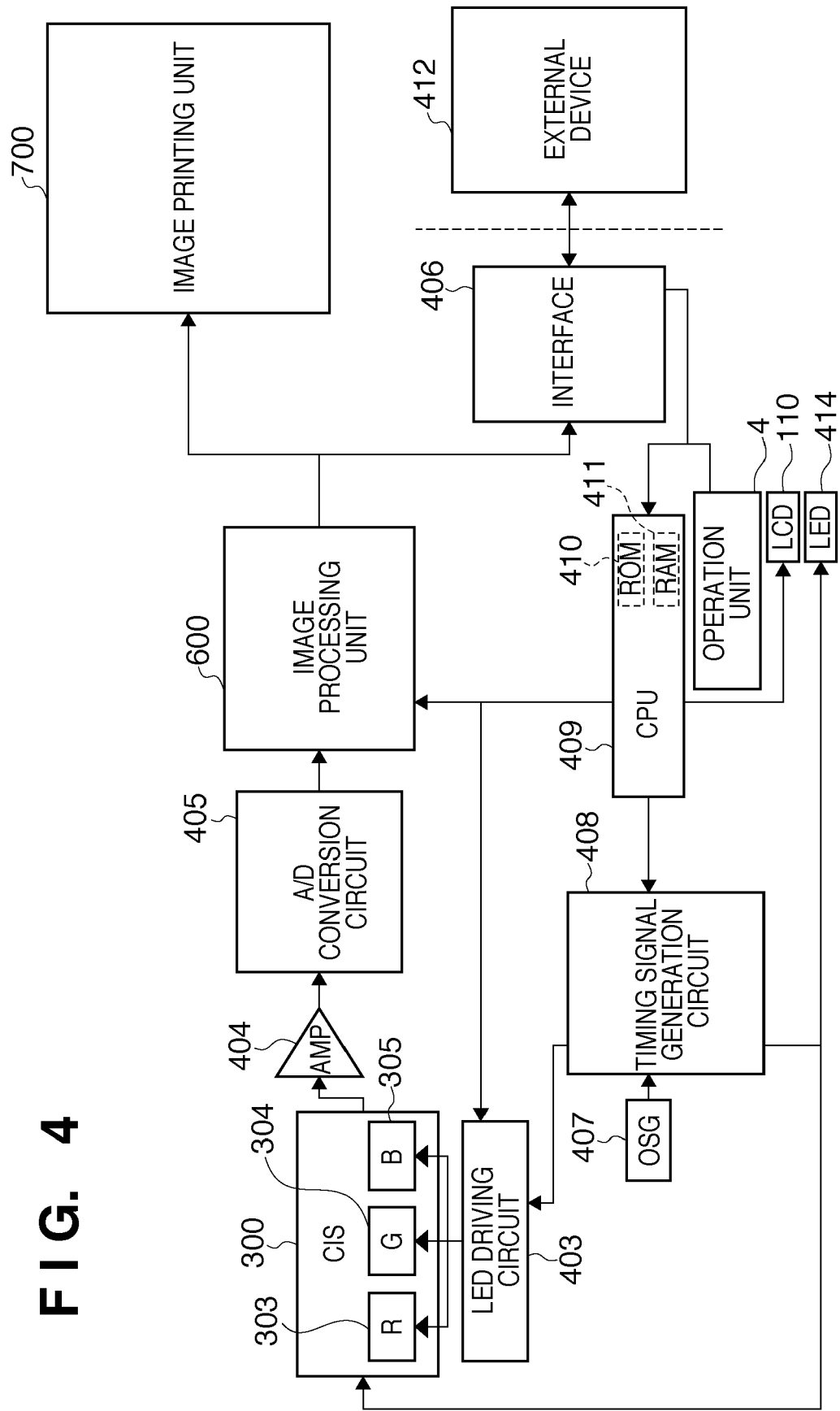
FIG. 4 is a block diagram showing the arrangement of the control circuit of the image reading apparatus.

FIG. 4 is a block diagram showing the arrangement of the control circuit of the image reading apparatus.

The same reference numerals as in FIGS. 1 to 3 denote already described constituent elements in FIG. 4, and a description thereof will not be repeated.

The CIS unit 300 line-sequentially reads a color image by causing an LED driving circuit 403 to selectively turn on the color LEDs 303 to 305 for each line. The LEDs 303 to 305 are light sources capable of changing the irradiation light amount on an original. The LED driving circuit 403 can arbitrarily turn on the LEDs 303 to 305.

More specifically, it is possible to sequentially turn on one or two of the LEDs 303 to 305 at a time or turn on all the three LEDs as needed. An amplifier (AMP) 404 amplifies the signal output from the CIS unit 300. An A/D conversion circuit 405 A/D-converts the amplified electrical signal and outputs, for example, 16-bit digital image data for each color component of each pixel. An image processing unit 600 processes the digital image data converted by the A/D conversion circuit 405. An interface control circuit (I/F) 406 reads out image data from the image processing unit 600 and transmits/receives control data to/from an external device 412 or outputs the image data. The image data from the image processing unit 600 can also be output to an image printing unit. The external device 412 is, for example, a personal computer (not shown).

An image printing unit 700 converts the image data from the interface control circuit 406 into binary data representing "print" or "not print" for each pixel and prints an image on a printing medium using printing materials. As the image printing unit 700, for example, an inkjet printer, a laser beam printer using an electrophotographic method, or a sublimation type printer is usable. These printers are known, and a detailed description thereof will be omitted.

The above-described series of processes is roughly classified into two types in accordance with the operation contents.

A copy or image reading (scanning) operation performed by the MFP apparatus alone will be described. In this case, the user of the apparatus inputs necessary instructions via the operation unit 4.

Figure 5:
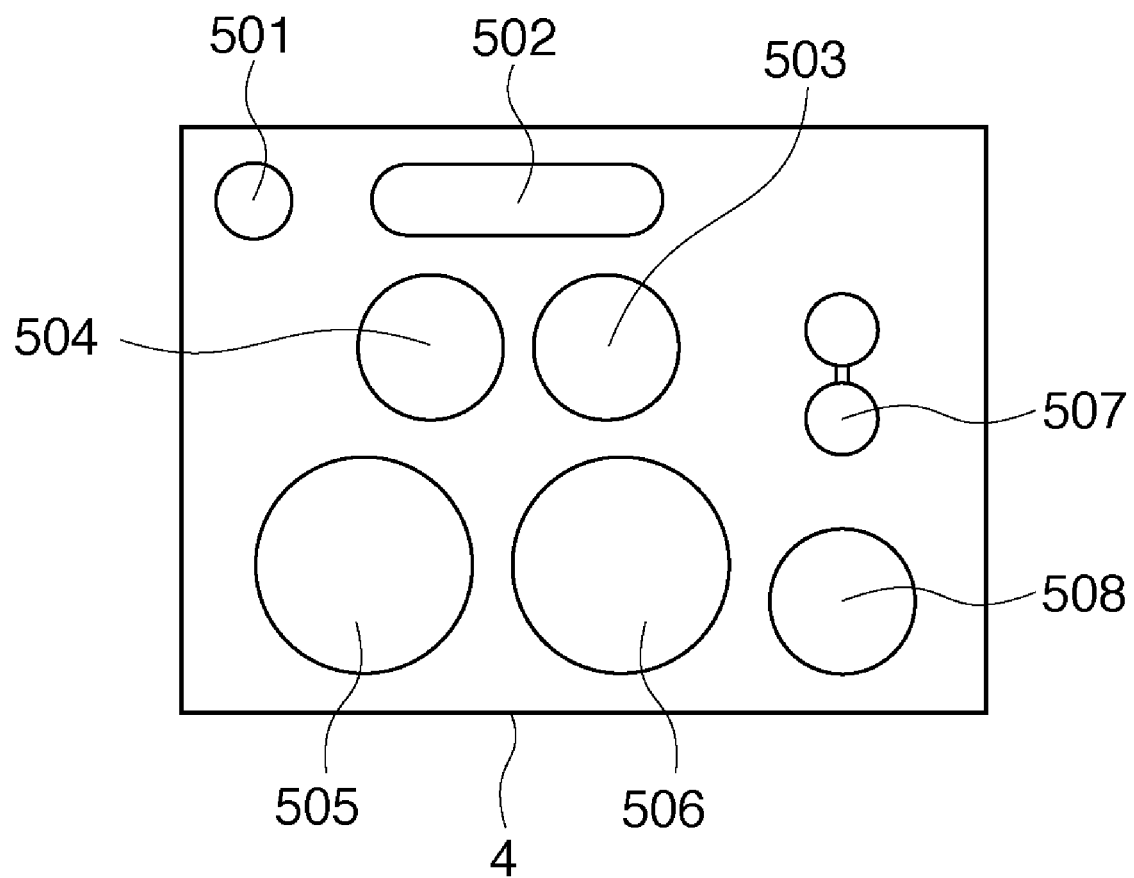
FIG. 5 is a view showing a detailed example of the arrangement of an operation unit.

FIG. 5 is a view showing a detailed example of the arrangement of the operation unit 4. The arrangement of the operation unit 4 will be described here with reference to FIG. 5.

The output signal from the operation unit 4 is connected to the input port of a CPU 409. A button 501 is a power key. A button 502 is a function selection button. Operable function contents are displayed on the LCD 110 in correspondence with the number of times of pressing the button 502. Operations are set in accordance with the displayed function contents. When the user presses a determination button 503, the contents are set in a RAM 411. A button 504 is a cancel button. When the user presses a button 505, a color copy operation starts in accordance with the settings in the RAM 411. When the user presses a button 506, a monochrome copy operation starts in accordance with the settings in the RAM 411. The user presses a button 507 to designate the number of sheets or density. A button 508 is a reset button. The user can press it to cancel scanning or printing.

The description will be continued with reference to FIG. 4.

The above-described operation instruction from the operation unit 4 is controlled by the CPU 409 in the form of a microcomputer. The CPU 409 reads out a processing program ("control program 670" in FIG. 6 to be described later) stored in a ROM 410 and executes the control using the RAM 411 as a work area. Referring to FIG. 4, reference numeral 407 denotes a reference signal oscillator (OSC) such as a quartz oscillator; and 408, a timing signal generation circuit which divides the output of the reference signal oscillator 407 in accordance with the settings of the CPU 409 to generate various kinds of timing signals as the base of operations.

For an operation based on an instruction from a personal computer (external device 412), a copy or image reading (scanning) instruction is issued from the personal computer to the CPU 409. The operation from then on is the same as in the copy or image reading (scanning) operation performed by the MFP apparatus alone.

An LED 414 serves as the backlight source of the LCD 110 and is ON/OFF-controlled by a lighting signal output from the timing signal generation circuit 408.

Details of the image processing unit 600 will be described next.

Figure 6:
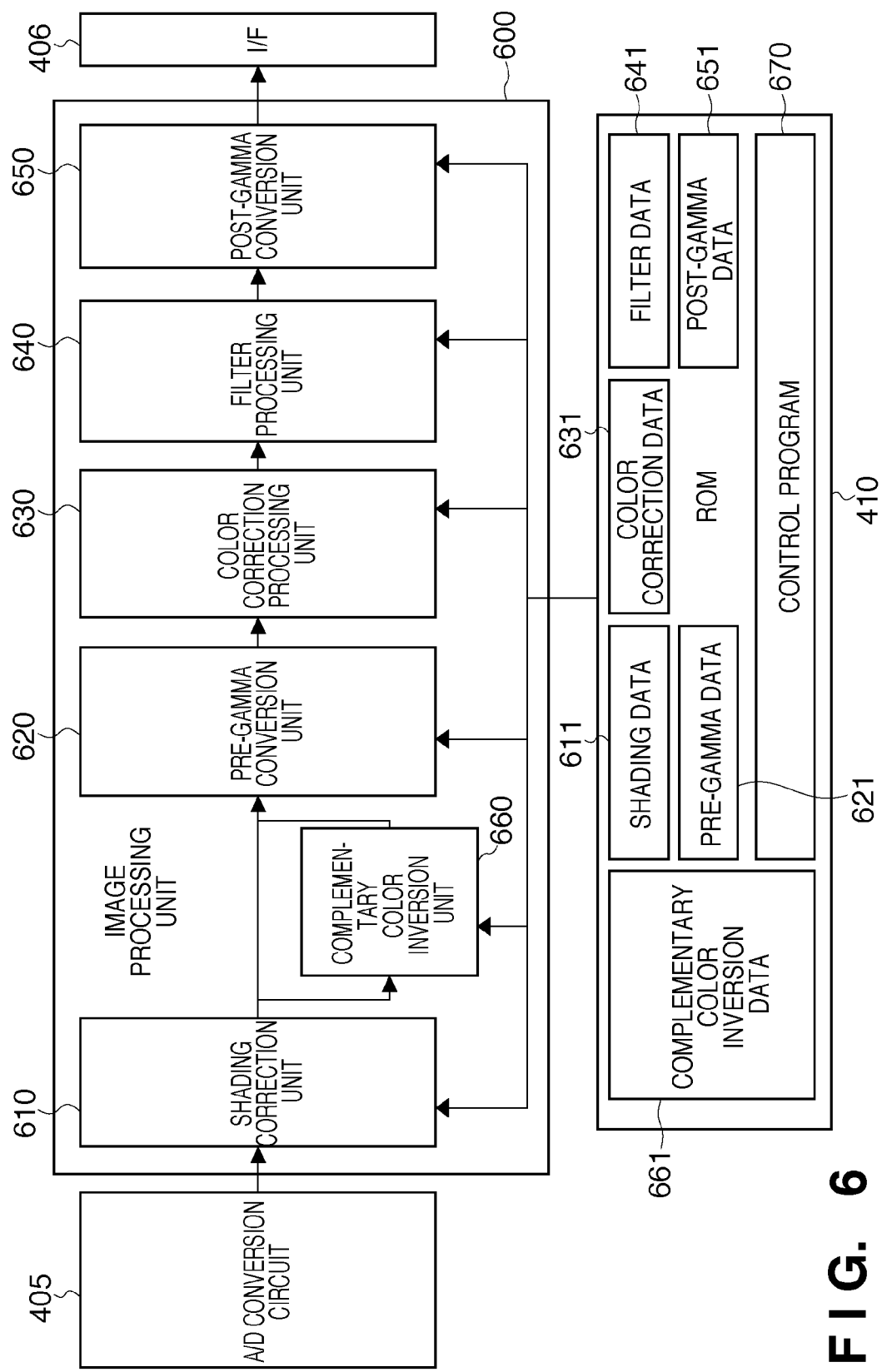
FIG. 6 is a block diagram showing the detailed arrangement of an image processing unit.

FIG. 6 is a block diagram showing the detailed arrangement of the image processing unit 600.

Digital image data converted by the A/D conversion circuit 405 is input to a shading correction unit 610. The shading correction unit 610 performs shading correction by reading a reference white board (not shown) bonded to the lower surface of an index plate (not shown) bonded to the original glass table 270 of the image reading apparatus 200.

Data used for the shading correction is shading data 611 stored in the ROM 410. The digital image data which has undergone the shading correction is input to a pre-gamma conversion unit 620. The pre-gamma conversion unit 620 performs gamma correction to obtain a visually preferable brightness distribution. Data used in the pre-gamma conversion unit 620 is pre-gamma data 621 stored in the ROM 410. The digital image data which has undergone the pre-gamma conversion is input to a color correction processing unit 630. The color correction processing unit 630 performs conversion processing to obtain preferable colors. Data used in the color correction processing unit 630 is color correction data 631 stored in the ROM 410.

The digital image data output from the color correction processing unit 630 is input to a filter processing unit 640. The filter processing unit 640 performs filter processing such as edge enhancement or noise reduction of the digital image data. Data used for the filter processing is filter data 641 stored in the ROM 410. The digital image data output from the filter processing unit 640 is input to a post-gamma conversion unit 650. The post-gamma conversion unit 650 fine-tunes the brightness characteristic of the received digital image data again in accordance with the application purpose. Data used in the post-gamma conversion unit 650 is post-gamma data 651 stored in the ROM 410. The digital image data output from the post-gamma conversion unit 650 is input to the interface control circuit (I/F) 406. Setting of these data from the ROM 410 to the respective processing units is implemented by causing the CPU 409 to read out and execute the contents of the control program 670.

A complementary color inversion unit 660 is an image processing unit which is used only when an instruction for complementary color reading is given. This processing is also controlled by the control program 670 stored in the ROM 410. Complementary color inversion data 661 stored in the ROM 410 is used for the processing. The control program also controls the operation of the LED driving circuit 403.

Embodiments of image processing executed by the MFP apparatus having the above-described arrangement will be described next in detail.

In a first embodiment, an example will be described in which variations on both the light emitting side and the light receiving side and interactions therebetween are absorbed, and variations in the entire image characteristic of each apparatus are also absorbed at the time of complementary color reading.

Figure 7:
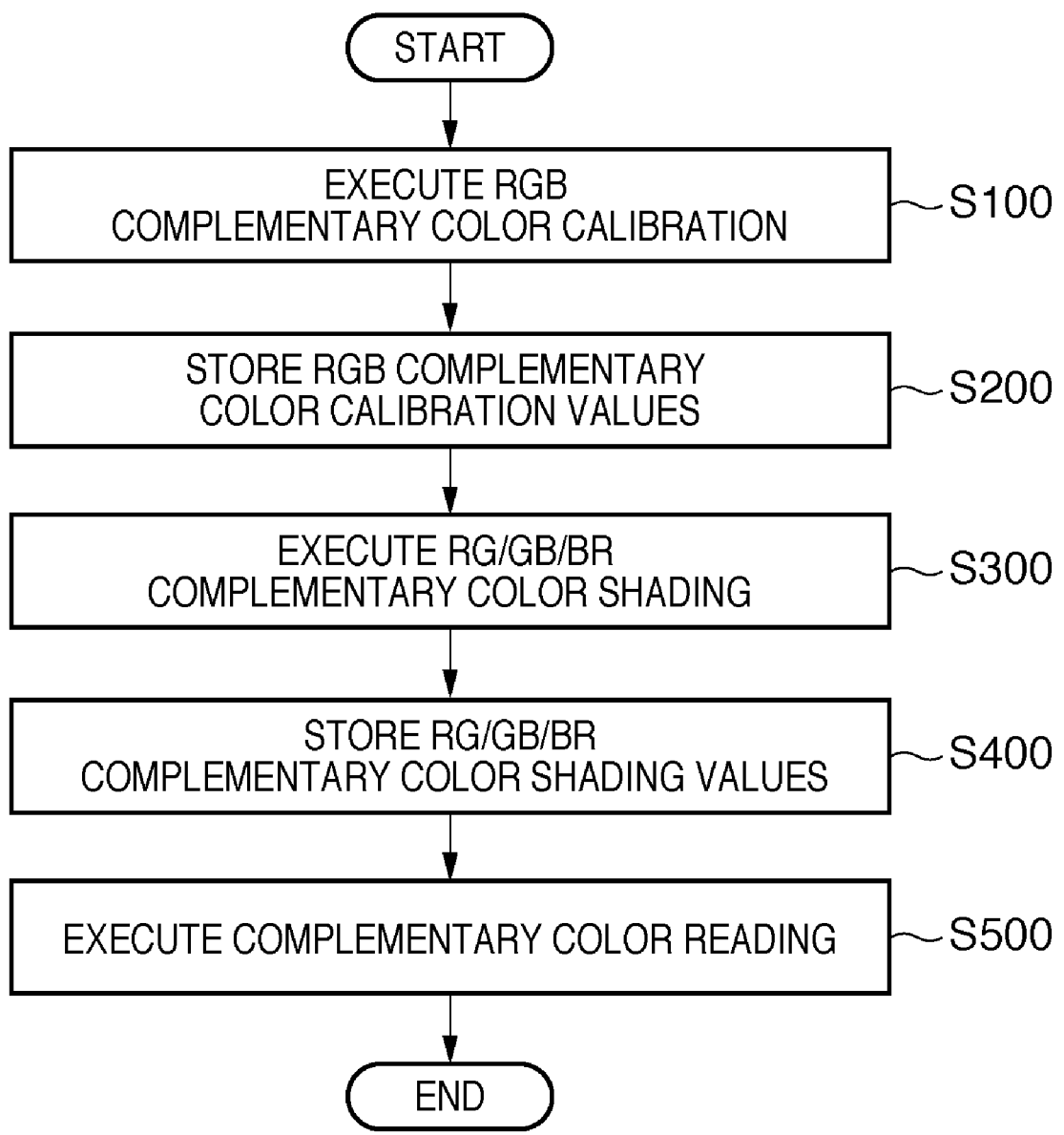
FIG. 7 is a flowchart illustrating the outline of processing of absorbing variations in the entire image characteristic of an MFP apparatus according to the first embodiment.

FIG. 7 is a flowchart illustrating the outline of processing of absorbing variations in the entire image characteristic of an MFP apparatus.

In step S100, RGB complementary color calibration is executed.

In this case, light emission times tR, tG, and tB of a red LED 303, green LED 304, and blue LED 305 are determined to adjust variations in the light emission characteristics of the LEDs 303 to 305.

Figure 8:
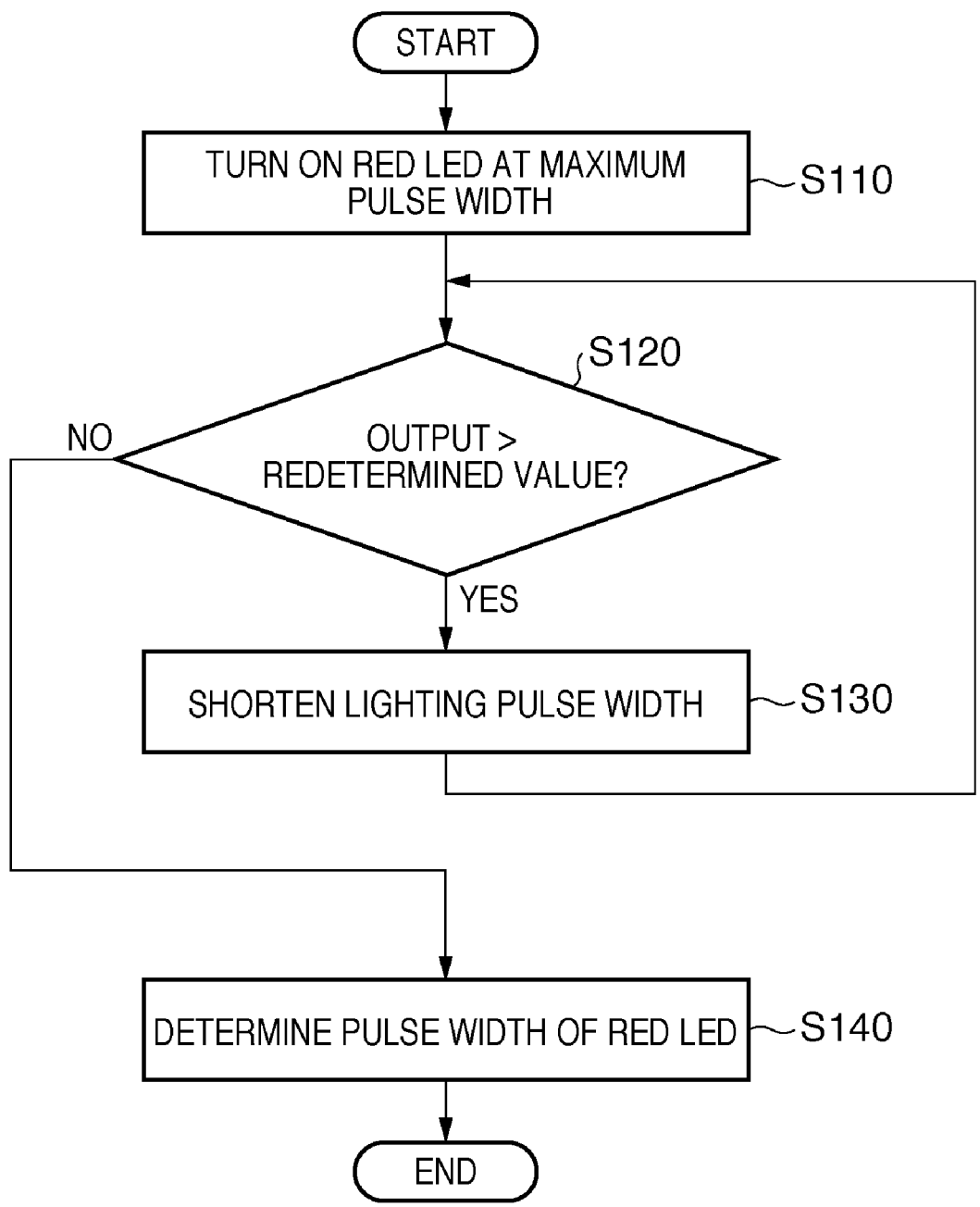
FIG. 8 is a flowchart illustrating details of calibration processing.

FIG. 8 is a flowchart illustrating details of calibration processing.

In this embodiment, calibration is performed in the order of red LED 303→green LED 304→blue LED 305. The flowchart in FIG. 8 explains calibration processing of the red LED 303. When calibrating the LEDs of other colors, the color of the LED in steps S110 and S140 changes to the color of the LED of the calibration target.

Calibration is performed by reading a reference white board (not shown) bonded to the lower surface of an index plate (not shown) bonded to an original glass table 270 of an image reading apparatus 200 and generating reference data.

In step S110, the red LED 303 is turned on at the maximum pulse width of the lighting signal.

In step S120, the output amplitude of the image signal in this light emission is measured. It is checked whether or not the output amplitude exceeds a predetermined value. If the output amplitude of the image signal exceeds the predetermined value, the process advances to step S130 to shorten the pulse width of the lighting signal. Then, the process returns to step S120 to check it again. This processing is repeated until it is determined in step S120 that the output amplitude of the image signal is equal to or smaller than the predetermined value.

If it is determined in step S120 that the output amplitude of the image signal is equal to or smaller than the predetermined value, the process advances to step S140 to determine the pulse width (tR) of the red LED.

The processes in steps S110 to S140 are performed for the green LED 304 and the blue LED 305, like the red LED 303, thereby determining the pulse width (tG) of the green LED and the pulse width (tB) of the blue LED.

The description will be continued with reference to FIG. 7.

In step S200, RGB complementary color calibration values (control values to cause an LED driving circuit 403 to implement the light emission times tR, tG, and tB of the LEDs) are stored in a RAM 411.

In step S300, RG/GB/BR complementary color shading is executed.

Figure 9:
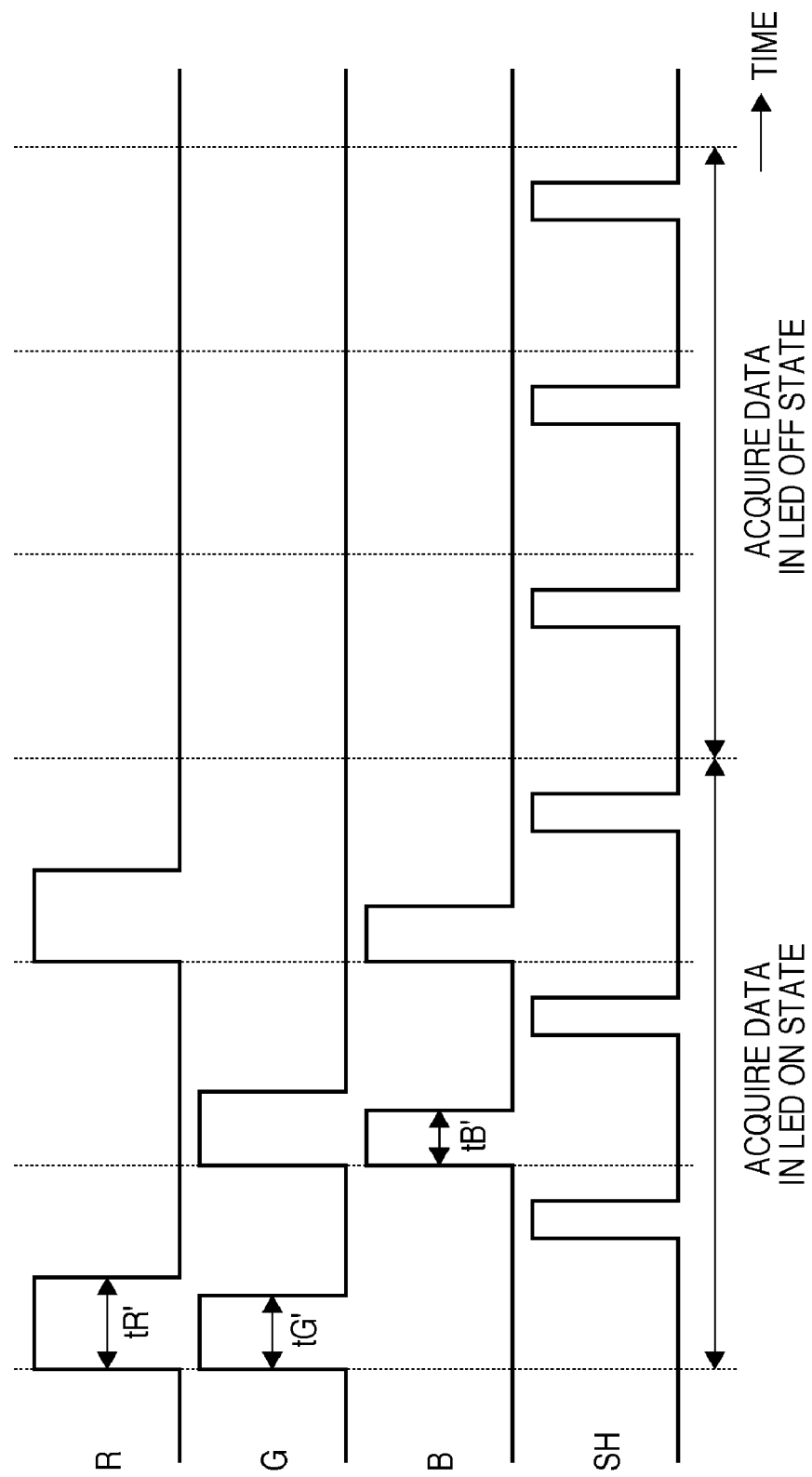
FIG. 9 is a timing chart showing the concept of complementary color shading.

FIG. 9 is a timing chart showing the concept of complementary color shading.

Complementary color shading is performed by reading the reference white board (not shown) bonded to the lower surface of the index plate (not shown) bonded to the original glass table 270 of the image reading apparatus 200 and generating reference data.

As shown in FIG. 9, first, the red LED 303 (R in FIG. 9) and the green LED 304 (G in FIG. 9) are turned on for periods of tR' and tG', respectively, and then turned off. When the LEDs are turned off, a signal SH is turned on to output data in an RG ON state.

Next, the green LED 304 and the blue LED 305 (B in FIG. 9) are turned on during periods of tG' and tB', respectively, and then turned off. When the LEDs are turned off, the signal SH is turned on to output data in a GB ON state.

Finally, the red LED 303 and the blue LED 305 are turned on during periods of tR' and tB', respectively, and then turned off. When the LEDs are turned off, the signal SH is turned on to output data in a BR ON state.

Data upon turning on each combination of two LEDs is output in this way.

Subsequently, the signal SH is turned on without turning on any one of the red LED 303, green LED 304, and blue LED 305 to output data in an LED OFF state.

Shading data has an output value corresponding to the main scanning position. Hence, the shading data in the LED ON state are represented by OnRG[x], OnGB[x], and OnBR[x]. The shading data in the LED OFF state are represented by OffRG[x], OffGB[x], and OffBR[x].

In this case, x indicates the pixel position in the main scanning direction.

The shading data are used for the following calculations in shading correction performed by a shading correction unit 610. The shading correction unit 610 calculates:

$$RGout[x]=RGtgt\times(RGin[x]-OffRG[x])/(OnRG[x]-OffRG[x]);$$

$$GBout[x]=GBtgt\times(GBin[x]-OffGB[x])/(OnGB[x]-OffGB[x]);\text{ and}$$

$$BRout[x]=BRtgt\times(BRin[x]-OffBR[x])/(OnBR[x]-OffBR[x]).$$

RGin[x], GBin[x], and BRin[x] are original read data in the RG ON state, GB ON state, and BR ON state, RGtgt, GBtgt, and BRtgt are target density setting coefficients in the RG ON state, GB ON state, and BR ON state, and RGout[x], GBout[x], and BRout[x] are data after shading correction in the RG ON state, GB ON state, and BR ON state.

In the example shown in FIG. 9, shading data in the LED OFF state is acquired three times, as in the LED ON state. However, since all LEDs are OFF, shading data may be acquired once and shared.

As for the ON periods tR', tG', and tB' of the three LEDs 303 to 305, the control values of the LED driving circuit 403 are appropriately set to satisfy the following conditions based on the RGB complementary color calibration values stored in step S200. The conditions are $$tR'=tR\times a, tG'=tG\times a, tB'=tB\times a$$

where a is a common constant.

In step S400, the complementary color shading data in the RG ON state, GB ON state, and BR ON state are stored in the RAM 411.

Finally, in step S500, complementary color reading is executed.

Figure 10:
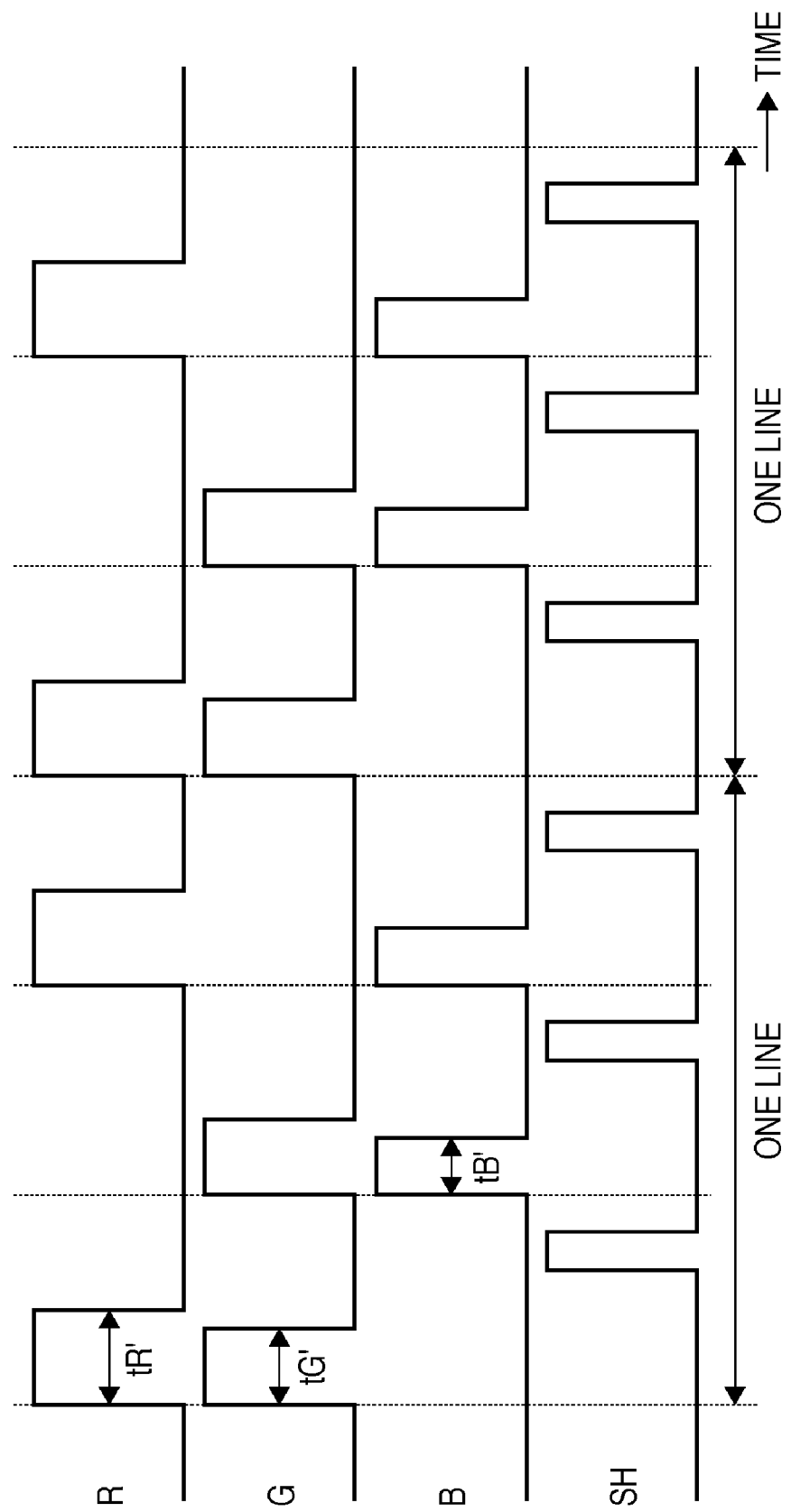
FIG. 10 is a timing chart showing the concept of a complementary color reading method.

FIG. 10 is a timing chart showing the concept of a complementary color reading method.

Complementary color reading is performed by reading an original 220 on the image reading apparatus 200.

First, the red LED 303 (R in FIG. 10) and the green LED 304 (G in FIG. 10) are turned on during the periods of tR' and tG', respectively, and then turned off. When the LEDs are turned off, the signal SH is turned on to output data in the RG ON state. Next, the green LED 304 and the blue LED 305 (B in FIG. 10) are turned on during the periods of tG' and tB', respectively, and then turned off. When the LEDs are turned off, the signal SH is turned on to output data in the GB ON state. Finally, the red LED 303 and the blue LED 305 are turned on during the periods of tR' and tB', respectively, and then turned off. When the LEDs are turned off, the signal SH is turned on to output data in the BR ON state.

With the above processing, data of one line is acquired. Then, data of the next line is acquired. The data acquisition is repeated for the necessary number of lines. The ON periods of the LEDs 303 to 305 are the same as those in step S300.

When executing complementary color reading again during the period when the complementary color calibration values stored in step S200 are being determined to be valid, the complementary color calibration in step S100 may be skipped, and the stored complementary color calibration values may be used. The period when the complementary color calibration values are being determined to be valid corresponds to, for example, a period from the preceding execution of complementary color calibration to the elapse of a predetermined time.

Similarly, when executing complementary color reading again during the period when the complementary shading values stored in step S400 are being determined to be valid, the complementary color shading in step S300 may be skipped, and the stored complementary color shading values may be used. The period when the complementary color shading values are being determined to be valid corresponds to, for example, a period from the preceding execution of complementary color shading to the elapse of a predetermined time, in which the complementary color calibration values are valid.

This speeds up execution of complementary color reading.

According to the above-described embodiment, the above processing is executed. In addition, the shading correction unit 610 executes shading correction. This makes it possible to absorb the variations on both the light emitting side and the light receiving side and interactions therebetween in complementary color reading. It is consequently possible to absorb the variations in the entire image characteristic of each MFP apparatus.

A second embodiment assumes an apparatus for performing both complementary color reading and primary color reading. An example will be described in which variations on both the light emitting side and the light receiving side and interactions therebetween are absorbed, and variations in the entire image characteristic of each apparatus are also absorbed in both complementary color reading and primary color reading.

Figure 11:
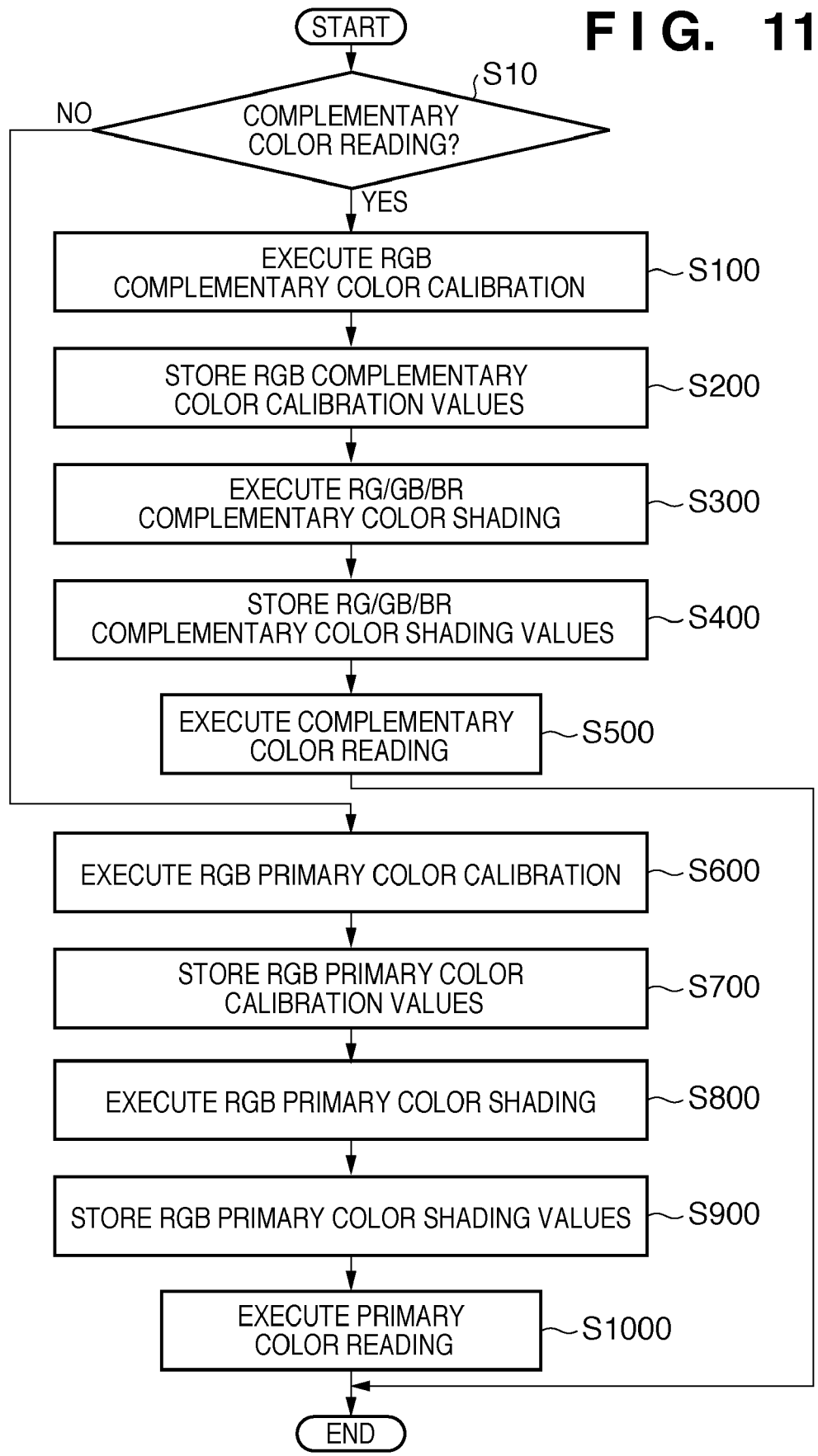
FIG. 11 is a flowchart illustrating the outline of processing of absorbing variations in the entire image characteristic of an MFP apparatus according to the second embodiment.

FIG. 11 is a flowchart illustrating the outline of processing of absorbing variations in the entire image characteristic of an MFP apparatus according to the second embodiment. The same step numbers as described in the first embodiment denote the same processing steps, and a description thereof will not be repeated.

First, in step S10, it is checked whether to execute complementary color reading. If it is determined to execute complementary color reading, processes in steps S100 to S500 are executed. On the other hand, if it is determined to execute primary color reading, the process advances to step S600.

In step S600, RGB primary color calibration is executed. In this case, light emission periods tR2, tG2, and tB2 of a red LED 303, green LED 304, and blue LED 305 are determined to adjust variations in the light emission characteristics of the LEDs 303 to 305. Details of the calibration processing are the same as in complementary color calibration already described in the first embodiment with reference to FIG. 8.

In step S700, RGB primary color calibration values (control values to cause an LED driving circuit 403 to implement the light emission periods tR2, tG2, and tB2) are stored in a RAM 411.

In step S800, RGB primary color shading is executed.

Figure 12:
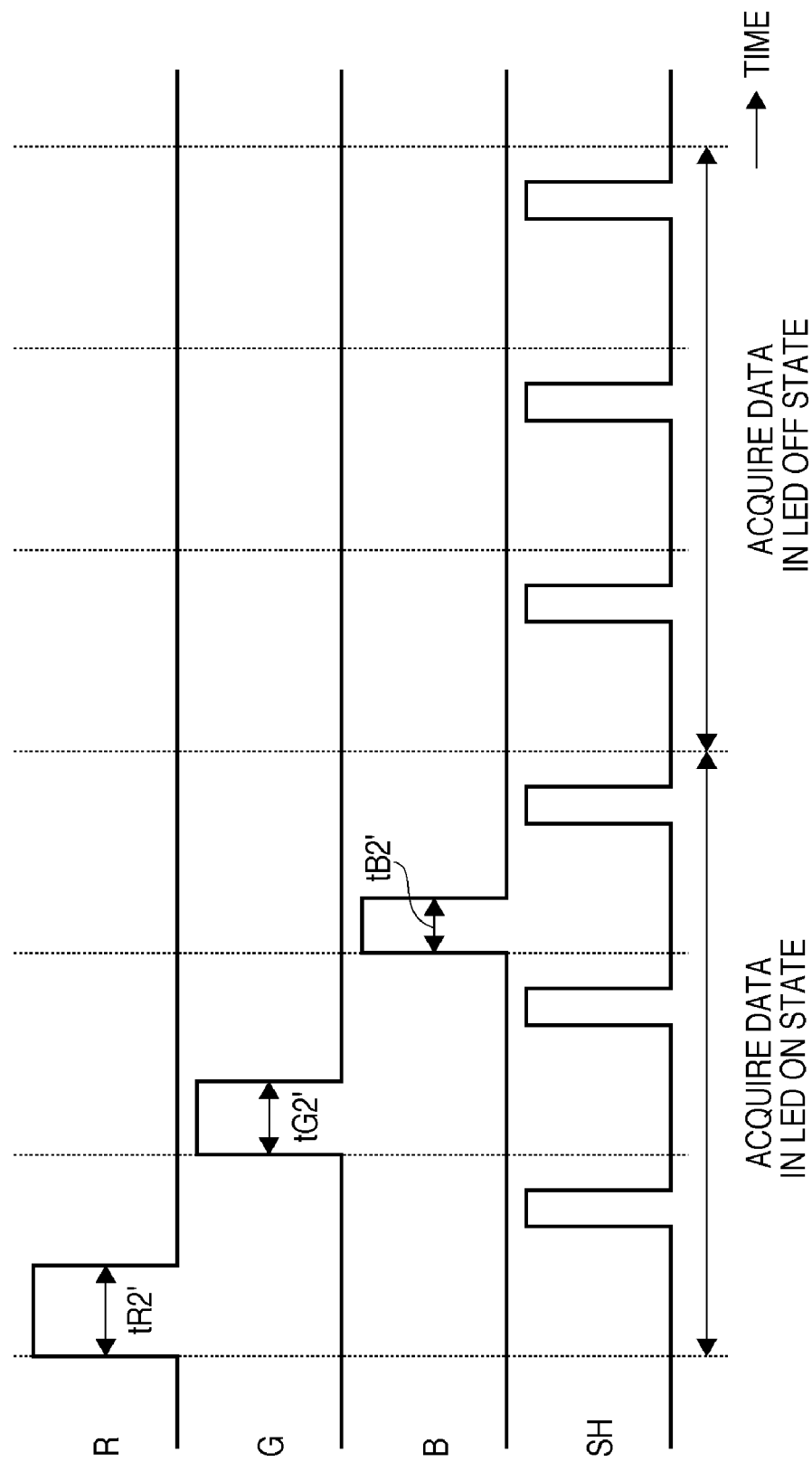
FIG. 12 is a timing chart showing the outline of a primary color shading method.

FIG. 12 is a timing chart showing the outline of a primary color shading method.

Primary color shading is performed by reading a reference white board (not shown) bonded to the lower surface of an index plate (not shown) bonded to an original glass table 270 of an image reading apparatus 200 and generating reference data.

As shown in FIG. 12, first, the red LED 303 (R in FIG. 12) is turned on during a period of tR2' and then turned off. When the LED is turned off, a signal SH is turned on to output data in an R ON state. Next, the green LED 304 (G in FIG. 12) is turned on during a period of tG2' and then turned off. When the LED is turned off, the signal SH is turned on to output data in a G ON state. Finally, the blue LED 305 (B in FIG. 12) is turned on during a period of tB2' and then turned off. When the LED is turned off, the signal SH is turned on to output data in a B ON state.

Data upon turning on each LED is output in this way.

Subsequently, the signal SH is turned on without turning on any one of the red LED 303, green LED 304, and blue LED 305 to output data in an LED OFF state.

Shading data has an output value corresponding to a pixel position (x) in the main scanning direction. The shading data are used for the following calculations in shading correction performed by the shading correction unit 610. The shading correction unit 610 calculates:

$$Rout[x]=Rtgt \times (Rin[x]-OffR[x])/(OnR[x]-OffR[x]);$$

$$Gout[x]=Gtgt \times (Gin[x]-OffG[x])/(OnG[x]-OffG[x]); \text{ and}$$

$$Bout[x]=Btgt \times (Bin[x]-OffB[x])/(OnB[x]-OffB[x]).$$

Rin[x], Gin[x], and Bin[x] are original read data in the R ON state, G ON state, and B ON state, Rtgt, Gtgt, and Btgt are target density setting coefficients in the R ON state, G ON state, and B ON state, and Rout[x], Gout[x], and Bout[x] are data after shading correction in the R ON state, G ON state, and B ON state.

In the example shown in FIG. 12, shading data in the LED OFF state is acquired three times, as in the LED ON state. However, since all LEDs are OFF, shading data may be acquired once and shared. As for the ON periods tR2', tG2', and tB2' of the LEDs 303 to 305, the control values of the LED driving circuit 403 are appropriately set to satisfy the following conditions based on the RGB primary color calibration values stored in step S700. The conditions are $$tR2'=tR2 \times b, tG2'=tG2 \times b, tB2'=tB2 \times b$$

where b is a common constant.

In step S900, the RGB primary color shading data are stored in the RAM 411.

Finally, in step S1000, primary color reading is executed.

Figure 13:
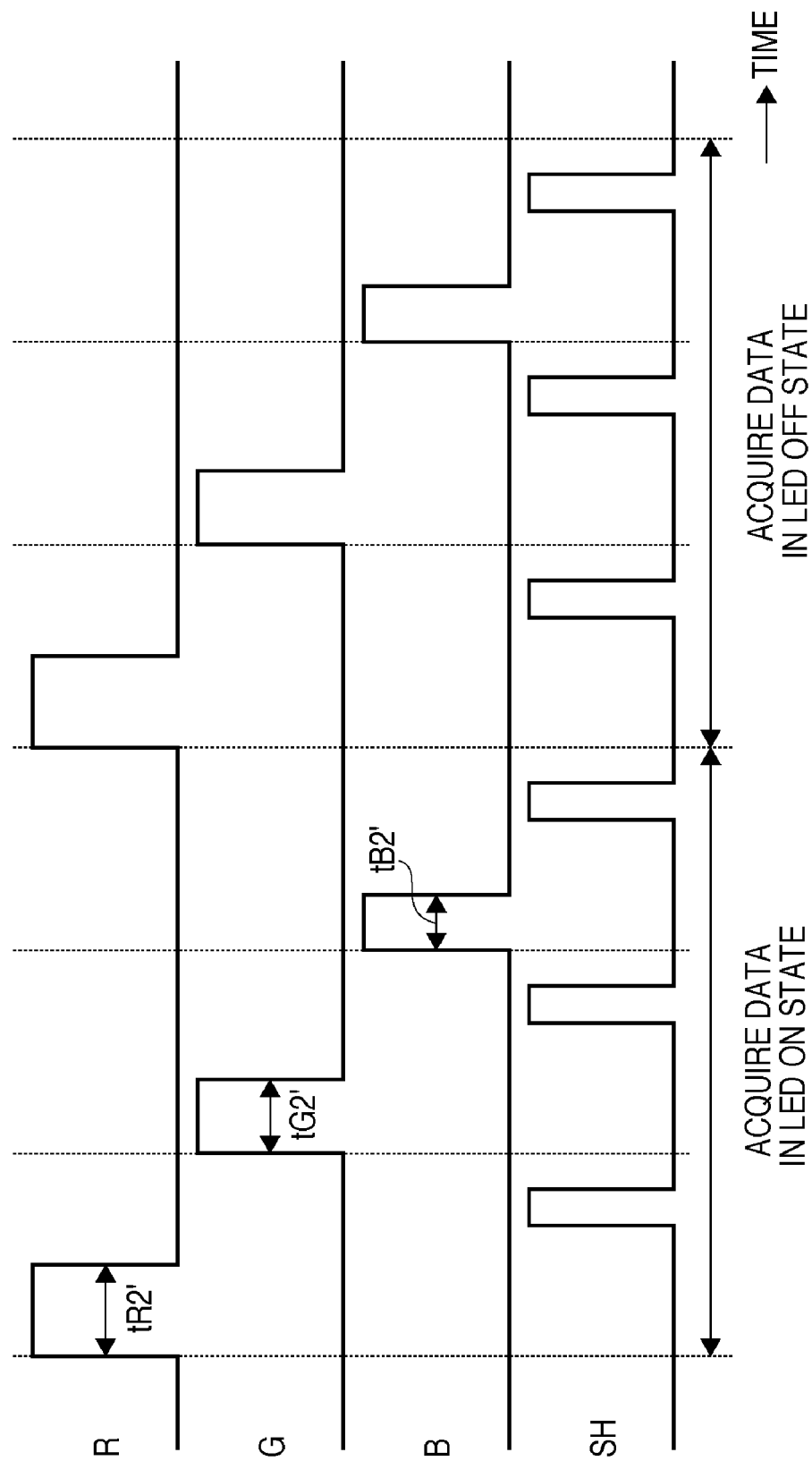
FIG. 13 is a timing chart showing the outline of a primary color reading method.

FIG. 13 is a timing chart showing the outline of a primary color reading method.

Primary color reading is performed by reading an original 220 on the image reading apparatus 200.

As shown in FIG. 13, first, the red LED 303 (R in FIG. 13) is turned on during the period tR2' and then turned off. When the LED is turned off, the signal SH is turned on to output data in the R ON state. Next, the green LED 304 (G in FIG. 13) is turned on during the period tG2' and then turned off. When the LED is turned off, the signal SH is turned on to output data in the G ON state. Finally, the blue LED 305 (B in FIG. 13) is turned on during the period tB2' and then turned off. When the LED is turned off, the signal SH is turned on to output data in the B ON state.

With the above processing, data of one line is acquired. Then, data of the next line is acquired. The data acquisition is repeated for the necessary number of lines. The ON periods tR2', tG2', and tB2' of the LEDs 303 to 305 are the same as those in the processing in step S800.

According to the above-described embodiment, the above processing is executed. In addition, the shading correction unit 610 executes shading correction. This makes it possible to absorb the variations on both the light emitting side and the light receiving side and interactions therebetween in both complementary color reading and primary color reading. It is consequently possible to absorb the variations in the entire image characteristic of each MFP apparatus.

The primary color calibration values stored in step S700 or the primary color shading values stored in step S900 may be reused when predetermined conditions are satisfied. In this case, the conditions that enable reuse of the calibration values and shading values of complementary color reading and the calibration values and shading values of primary color reading are the same as those described above. This speeds up execution of both complementary color reading and primary color reading.

In this embodiment, control values corresponding to two reading methods, that is, the calibration values and shading values of complementary color reading and the calibration values and shading values of primary color reading are stored in the RAM 411. In this embodiment, since the RAM 411 holds two kinds of control values, the necessary storage area size is twice as large as that of the first embodiment.

However, an arrangement using one of the two reading methods can make the necessary storage area size equal to that of the first embodiment by storing two control values in a single area of the RAM 411. This allows reduction of the memory capacity as compared to the arrangement that stores two control values separately. In this case, new conditions are added to the above-described conditions that enable reuse of the calibration values and shading values of complementary color reading and the calibration values and shading values of primary color reading.

That is, a condition "primary color calibration and shading are not executed after the latest execution of complementary color reading" is necessary for the reuse of the calibration values and shading values of complementary color reading. Additionally, a condition "complementary color calibration and shading are not executed after the latest execution of primary color reading" is necessary for the reuse of the calibration values and shading values of primary color reading. Since the reuse enabling conditions become slightly stricter, the advantage of speeding up execution of both complementary color reading and primary color reading decreases.

In a third embodiment, an example will be described in which the number of times of calibration is reduced to decrease the calibration data storage area, in addition to the effect achieved in the second embodiment.

Figure 14:
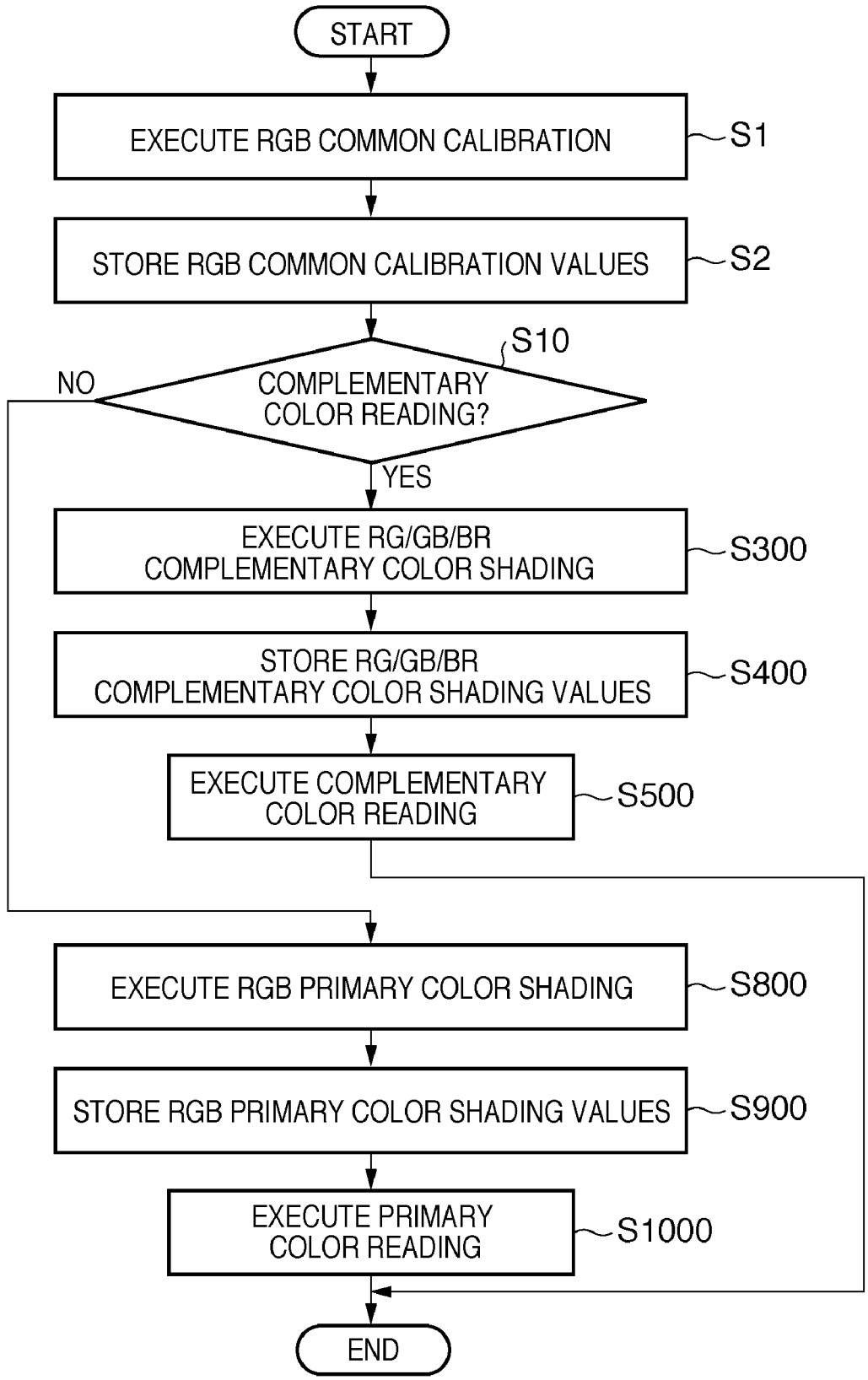
FIG. 14 is a flowchart illustrating the outline of processing of absorbing variations in the entire image characteristic of an MFP apparatus according to the third embodiment.

FIG. 14 is a flowchart illustrating the outline of processing of absorbing variations in the entire image characteristic of an MFP apparatus according to the third embodiment. The same step numbers as described in the first and second embodiments denote the same processing steps, and a description thereof will not be repeated.

First, in step S1, RGB common calibration to be commonly used in RGB complementary color reading and RGB primary color reading is executed. In this case, light emission periods tR3, tG3, and tB3 of a red LED 303, green LED 304, and blue LED 305 are determined to adjust variations in the light emission characteristics of the LEDs 303 to 305. Details of the calibration processing are the same as in complementary color calibration and primary color calibration already described with reference to FIG. 8, and a description thereof will not be repeated.

In step S2, RGB common calibration values (control values to cause the LED driving circuit 403 to implement the light emission periods tR3, tG3, and tB3) are stored in a RAM 411. In this embodiment, since the common calibration values are shared by subsequent complementary color shading and primary color shading, the calibration data stored in the RAM 411 can be ½ as compared to a case where the calibration data are not shared.

Processes in steps S10, S300, S400, and S500 are executed. In complementary color shading in step S300 of this embodiment, the ON periods of the red LED 303, green LED 304, and blue LED 305 are set to tR3', tG3', and tB3'. This is because the control values of the LED driving circuit 403 are appropriately set to satisfy the following conditions based on the RGB common calibration values stored in step S2. The conditions are $$tR3'=tR3 \times c,\ tG3'=tG3 \times c,\ tB3'=tB3 \times c$$

where c is a common constant.

The ON periods of the red LED 303, green LED 304, and blue LED 305 when executing complementary color reading in step S500 are tR3', tG3', and tB3' which are the same as the ON periods in step S300.

If it is determined in step S10 that the image reading method is primary color reading, the process advances to step S800. Then, processes in steps S800, S900, and S1000 are executed.

In primary color shading in step S800 of this embodiment, the ON periods of the red LED 303, green LED 304, and blue LED 305 are set to tR3", tG3", and tB3". This is because the control values of the LED driving circuit 403 are appropriately set to satisfy the following conditions based on the RGB common calibration values stored in step S2. The conditions are $$tR3''=tR3 \times d,\ tG3''=tG3 \times d,\ tB3''=tB3 \times d$$

where d is a common constant.

The ON periods of the red LED 303, green LED 304, and blue LED 305 when executing primary color reading in step S1000 are tR3", tG3", and tB3" which are the same as the ON periods in step S800.

The constant d to determine the LED ON periods in primary color shading is preferably larger than the constant c to determine the LED ON periods in complementary color shading. More preferably, d≈2×c is satisfied to effectively use the dynamic range of the read sensor.

The relationship between the constants a and b in the second embodiment can also obtain the same effect as that of the relationship between the constants c and d. However, the third embodiment using the common calibration values tR3, tG3, and tB3 is more effective. The complementary color reading and the complementary color reading calibration described in the first to fourth embodiments assumes that two LEDs to be turned on of the red LED 303, the green LED 304, and the blue LED 305 are "simultaneously turned on". The term "simultaneously turned on" means that these LEDs are "turned on during a period of time until the pulse signal SH becomes ON". In other words, although the above embodiments explain about the example in which the turn-on timings for two LEDs to be turned on are aligned, the term "simultaneously turn on" includes a case where two LEDs are turned on at any timing until the pulse signal SH becomes ON. For example, Japanese patent Laid-Open No. 2005-184390 discloses a case where the turn-on timings for two LEDs to be turned on are not overlapped. However, even in such a case, if both of two LEDs are turned on for a necessary period of time before the pulse signal SH becomes ON, it can be said that these two LEDs are "simultaneously turned on".

The common calibration values stored in step S2, the complementary color shading values stored in step S400, or the primary color shading values stored in step S900 may be reused when predetermined conditions are satisfied. This further speeds up execution of complementary color reading and primary color reading.

According to the above-described embodiment, it is possible to obtain the effect of the second embodiment and also make the calibration data storage area smaller. This contributes to decrease the necessary memory capacity and reduce the cost of the apparatus.

In a fourth embodiment, an example will be described in which the number of times of moving the sensor to the calibration and shading position is reduced to execute calibration and shading at a higher speed, in addition to the effect achieved in the third embodiment.

Figure 15:
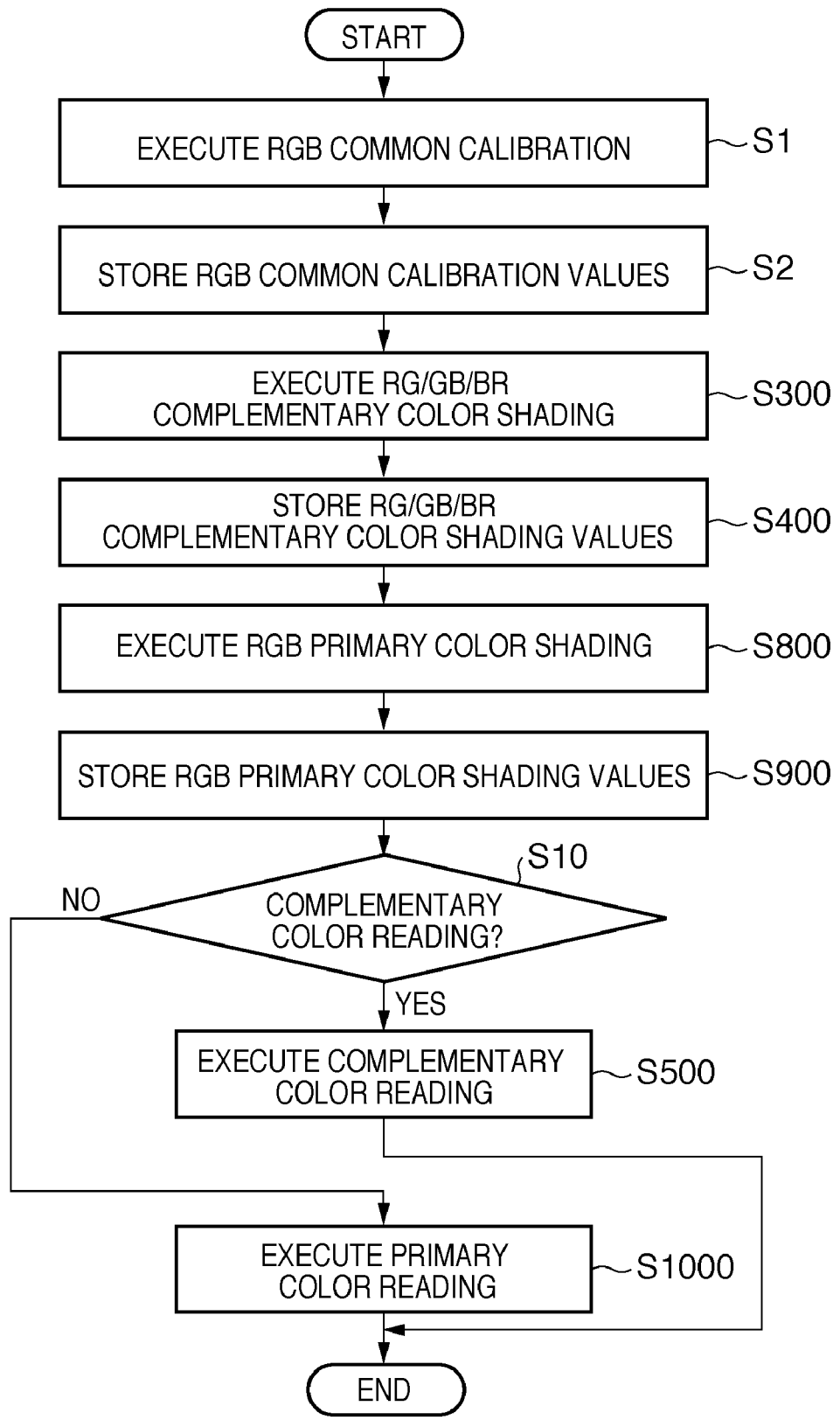
FIG. 15 is a flowchart illustrating the outline of processing of absorbing variations in the entire image characteristic of an MFP apparatus according to the fourth embodiment.
Figure 16:
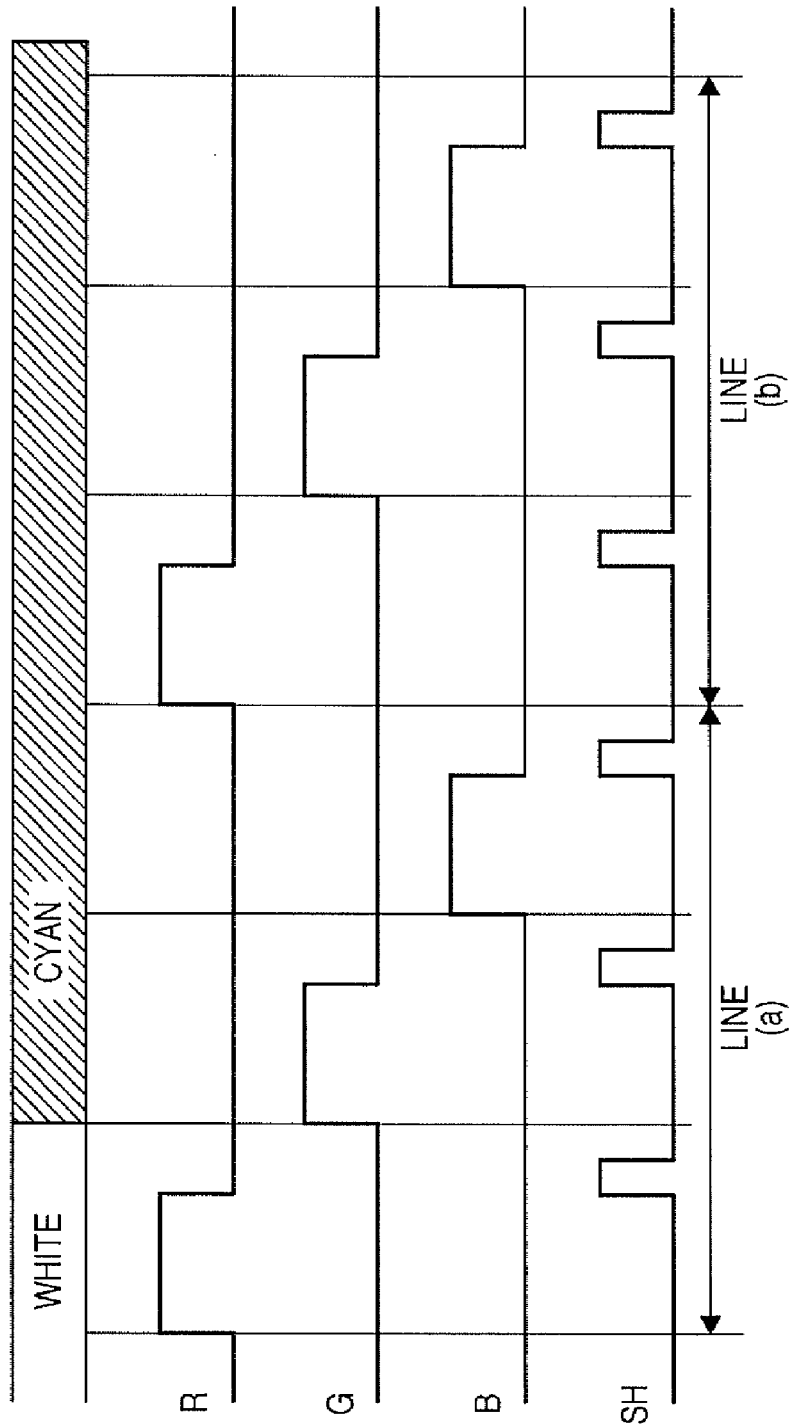
FIG. 16 is a timing chart showing a complementary color reading method of reading an image original by simultaneously turning on two color LEDs.
Figure 17:
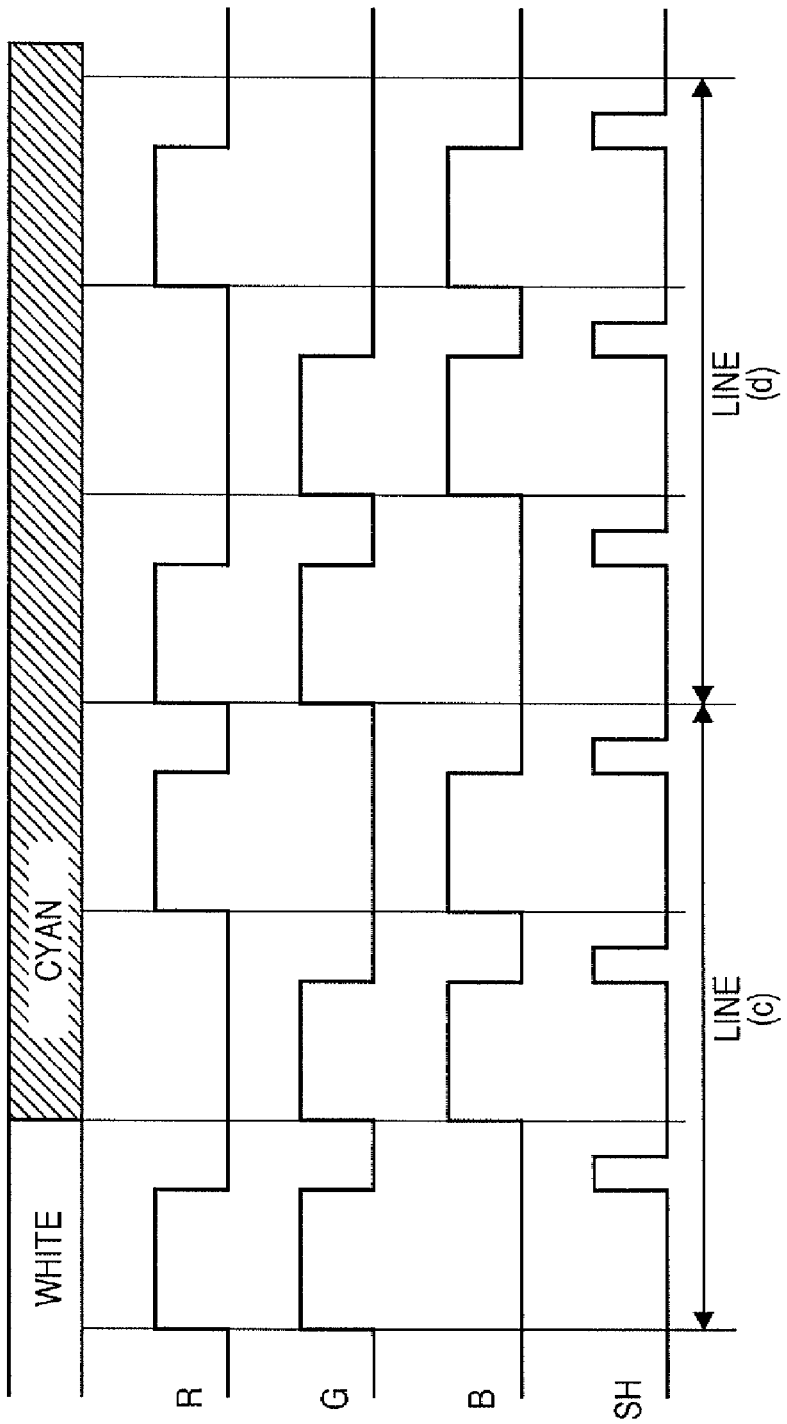
FIG. 17 is a timing chart showing a method of reading an image original using a two-color LED time-divisional lighting method.

FIG. 15 is a flowchart illustrating the outline of processing of absorbing variations in the entire image characteristic of an MFP apparatus according to the fourth embodiment. The same step numbers as described in the first to third embodiments denote the same processing steps, and a description thereof will not be repeated.

First, processes in steps S1, S2, S300, and S400 are executed sequentially. Then, processes in step S800 and S900 are executed.

After these processes, step S10 is executed to check whether to execute complementary color reading or primary color reading as image reading. If it is determined to execute complementary color reading, the process advances to step S500. If it is determined to execute primary color reading, the process advances to step S1000.

As described in the first to third embodiments, calibration and shading are performed by reading a reference white board (not shown) bonded to the lower surface of an index plate (not shown) bonded to an original glass table 270 of an image reading apparatus 200 and generating reference data. To perform calibration and shading, the sensor is temporarily moved to the reference white board reading position. After calibration and shading are executed, the sensor is moved to the original reading start position. Then, image reading starts.

Assume that complementary color reading is executed in the first image original reading, and primary color reading is executed in the next image original reading. In the third embodiment, it is necessary to execute the following steps.

That is, move the sensor to the reference white board reading position→common calibration→complementary color shading→move the sensor to the original reading start position→complementary color reading→move the sensor to the reference white board reading position→primary color shading→move the sensor to the original reading start position→primary color reading.

On the other hand, the fourth embodiment requires move the sensor to the reference white board reading position→common calibration→complementary color shading→primary color shading→move the sensor to the original reading start position→complementary color reading→move the sensor to the original reading start position→primary color reading.

As is apparent from comparison, the fourth embodiment can reduce the number of times of moving the sensor to the reference white board reading position by one.

According to the above-described embodiment, it is possible to obtain the effect of the third embodiment and also reduce the number of times of moving the sensor to the calibration and shading position. This further speeds up execution of calibration and shading.

According to the above-described embodiments, shading correction is executed using shading values which are acquired based on calibration values acquired by calibration. This makes it possible to absorb the variations on both the light emitting side and the light receiving side and interactions therebetween and also absorb the variations in the entire image characteristic of each MFP apparatus even in complementary color reading.

As the reference to determine whether the calibration values and shading values can be reused, the elapse time from the preceding processing has been exemplified. However, the present invention is not limited to this. Any other reference may be used as needed in accordance with the configuration of the apparatus.

For example, the possibility of image quality degradation after the time when the user has recognized image quality degradation can be reduced by determining execution of calibration or shading in accordance with a user instruction. When the number of read images is used as a reference, the processing can cope with a degradation in the light emission characteristic corresponding to the light emission time of each LED. It is therefore possible to reduce image quality degradation caused by the light emission time. When the absolute temperature of the sensor is used as a reference, the processing can take into consideration the temperature dependency of the light emission characteristic of an LED or the temperature dependency of the sensitivity characteristic of the sensor. It is therefore possible to reduce image quality degradation caused by the sensor temperature. When the relative temperature from calibration or shading is used as a reference, image quality degradation caused by the sensor temperature can be reduced.

Using different references for complementary color reading and primary color reading enables control adaptive to the physical characteristic generated by the difference in the LED lighting method between complementary color reading and primary color reading. For example, a change in the light emission characteristic caused by the continuous ON period of an LED has a great influence in primary color reading in which the ON period of one cycle is relatively long. Hence, complementary color reading and primary color reading preferably use different references in some cases.

It goes without saying that any combination of the above-described first to four embodiments is possible.

In the above-described embodiments, it is possible to increase the printing density and resolution particularly using, of inkjet printing methods, a method of changing the ink state by heat energy generated by a means (e.g., electro-thermal transducer) for generating heat energy for ink discharge.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-331068, filed Dec. 21, 2007, which is hereby incorporated by reference herein in its entirety.

What is claimed is:

1. An image reading apparatus which irradiates an image original with light, receives reflected light, and reads the image original based on the received light, the apparatus comprising:

light emitting means for emitting light components of three primary colors;

light receiving means for receiving the light reflected by the image original irradiated with the light emitting means;

image processing means for processing image data obtained based on the reflected light received by the light receiving means; and lighting control means for controlling the light emitting means to read the image original using one of primary color reading performed by causing the light emitting means to sequentially irradiate the image original with the light components of three primary colors and read the image original, and complementary color reading performed by causing the light emitting means to irradiate the image original with one of three different color combinations, which includes two of the light components of three primary colors, and read the image original, wherein the image processing means executes shading correction of the image data based on calibration data obtained by calibrating the light emitting means, wherein an ON period of the light emitting means at a time upon the primary color reading is longer than that upon the complementary color reading, and wherein a criterion as to whether or not the calibration is performed again upon the primary color reading differs from that upon the complementary color reading.

2. The apparatus according to claim 1, wherein the light emitting means includes a red LED, a green LED, and a blue LED, and a pulse width of a lighting signal corresponding to each of the red LED, the green LED, and the blue LED is determined by the calibration.

3. The apparatus according to claim 1, wherein the shading correction by the image processing means is executed when executing the complementary color reading.

4. The apparatus according to claim 3, wherein the shading correction by the image processing means is further executed when executing the primary color reading.

5. The apparatus according to claim 4, wherein the shading correction when executing the complementary color reading and the shading correction when executing the primary color reading are based on calibration data obtained by calibration separately executed for the complementary color reading and the primary color reading.

6. The apparatus according to claim 4, wherein the shading correction when executing the complementary color reading and the shading correction when executing the primary color reading are based on calibration data obtained by calibration commonly executed for the complementary color reading and the primary color reading.

7. The apparatus according to claim 6, further comprising:
scanning means for scanning the light emitting means and the light receiving means with respect to the image original;
a reference white board; and
control means for controlling operation of the scanning means to move the light emitting means and the light receiving means to a position of the reference white board, causing the light emitting means to emit light to the reference white board, and causing the light receiving means to receive the light reflected by the reference white board in order to generate reference data to be used in the calibration and the shading correction.

8. The apparatus according to claim 7, further comprising:
shading data generation means for simultaneously generating shading data for the complementary color reading and shading data for the primary color reading based on the calibration data obtained by the calibration commonly executed for the complementary color reading and the primary color reading; and
a memory which stores the shading data generated by the shading data generation means.

9. A multifunction printer comprising:
an image reading apparatus according to claim 1; and
print means for printing an image on a printing medium based on one of externally input image data and image data representing an image read by the image reading apparatus.

10. An image processing method of causing light emitting means for emitting light components of three primary colors to irradiate an image original with light, causing light receiving means to receive reflected light, and processing image data obtained based on the received light, the method comprising:
a primary color reading step of causing the light emitting means to sequentially irradiate the image original with the light components of three primary colors and read the image original; and
a complementary color reading step of causing the light emitting means to irradiate the image original with one of three different color combinations, which includes two of the light components of three primary colors, and read the image original,
wherein each of the primary color reading step and the complementary color reading step includes an image processing step of executing shading correction of the image data based on calibration data obtained by calibrating the light emitting means when reading the image original,
wherein an ON period of the light emitting means at a time upon the primary color reading is longer than that upon the complementary color reading, and
wherein a criterion as to whether or not the calibration is performed again upon the primary color reading differs from that upon the complementary color reading.

* * * * *